United States Patent
Dolph (10) Patent No.: US 8,331,761 B2
(45) Date of Patent: *Dec. 11, 2012

(54) DIGITAL VIDEO RECORDING DEVICE TICKER PLAYBACK SYSTEM AND METHOD

(75) Inventor: Blaine H. Dolph, Western Springs, IL (US)

(73) Assignee: International Business Machines Corporation, Armonk, NY (US)

( * ) Notice: Subject to any disclaimer, the term of this patent is extended or adjusted under 35 U.S.C. 154(b) by 1187 days.

This patent is subject to a terminal disclaimer.

(21) Appl. No.: 12/154,202

(22) Filed: May 21, 2008

(65) Prior Publication Data

US 2008/0219647 A1    Sep. 11, 2008

Related U.S. Application Data

(62) Division of application No. 11/249,941, filed on Oct. 13, 2005, now Pat. No. 7,697,820.

(51) Int. Cl.
 *H04N 9/80* (2006.01)

(52) U.S. Cl. ....................................... 386/240

(58) Field of Classification Search .................. 386/239, 386/240, 248, 262, 286, 287
See application file for complete search history.

(56) References Cited

U.S. PATENT DOCUMENTS

| 6,002,394 | A * | 12/1999 | Schein et al. .................. 725/39 |
| 6,006,241 | A | 12/1999 | Purnaveja et al. |
| 6,173,317 | B1 | 1/2001 | Chaddha et al. |
| 6,230,172 | B1 | 5/2001 | Purnaveja et al. |
| 6,526,215 | B2 | 2/2003 | Hirai et al. |
| 6,833,865 | B1 | 12/2004 | Fuller et al. |
| 6,877,134 | B1 | 4/2005 | Fuller et al. |
| 7,697,820 | B2 * | 4/2010 | Dolph ........................... 386/262 |
| 2005/0111644 | A1 | 5/2005 | Edwards |
| 2006/0177200 | A1 * | 8/2006 | Deutmeyer et al. ............. 386/98 |

OTHER PUBLICATIONS

A metadata model supporting scalable interactive TV services Gwenael Durand, Uwe Rauschenbach, Gabriella Kazai, Mounia Lalmas, and Patrick Wolf (Proceedings of the 11th International Multimedia Modeling Conference. Date of Conference: Jan. 12-14, 2005).*

Office Action (Mail Date Jun. 23, 2009) for U.S. Appl. No. 11/249,941, filed Oct. 13, 2005, First Named Inventor Blaine H. Dolph, Confirmation No. 3353.

Notice of Allowance (Mail Date Dec. 1, 2009) for U.S. Appl. No. 11/249,941, filed Oct. 13, 2005, Confirmation No. 3353.

* cited by examiner

*Primary Examiner* — Tat Chio (74) *Attorney, Agent, or Firm* — Schmeiser, Olsen & Watts; Mark Vallone (57) ABSTRACT

A system and method of controlling the playback of the event stream information of a particular television channel by a digital video recorder (DVR). The DVR is a computer system configured with a hard drive and video decoder/encoder devices. The hardware environment of DVR (100) includes an input interface (102), tuner (105), MPEG-2 encoder (120), MPEG-2 decoder (110), external mass storage device (125), a central processing unit (CPU) (135), internal memory (127), operating system (140), and event stream generator (250). The system and method of controlling the playback function of the present invention is primarily implemented within event stream generator (250). Event stream generator (250) generates a new video stream for playback onto the television by incorporating the broadcasted event stream information into the selected recorded video stream.

17 Claims, 7 Drawing Sheets

MPEG – 2 Video Stream Packet

DIGITAL VIDEO RECORDING DEVICE TICKER PLAYBACK SYSTEM AND METHOD

This application is a Divisional application claiming priority to Ser. No. 11/249,941, filed Oct. 13, 2005, issued Apr. 13, 2010, U.S. Pat. No. 7,697,820.

FIELD OF THE INVENTION

The present invention relates to video recording devices. More particularly the present invention relates to the playback of recorded programs, containing visual news tickers, on digital video recording devices (DVRs).

BACKGROUND OF THE INVENTION

The introduction of videocassette recording devices (VCR) was one of the most important events in the history of television. Prior to the VCR people had little control over what they watch on their television. Prior to VCR's there was no such thing as video stores. Today VCR's are commonplace and are an integral part of the television watching activity. The VCR is merely a recording tool utilizing a blank cassette tape. In 1999, Digital Video Recorders (DVRs) hit the market providing television viewers recording capabilities far beyond the limits of the VCR. At the heart of the DVR system is a computer hard drive that stores television programs as digital files. Since the DVR internally stores digital files, the user is provided with more options with regard to the program recoding function and the program playback function.

In addition to the main content of a television program, many programs have a news ticker usually displayed at the bottom portion of the screen. The ticker provides up to date information about various news related items. The ticker event data is a continuous stream of text data embedded in the video stream and displayed on the lower portion of the television screen. Normally, ticker event data is used on popular news television stations such as CNN and ESPN. Currently the DVR records the television program and stores the ticker event data as part of the recording. At a later time, during the playback of the prior recorded video stream, the ticker event data is usually stale. As a result, the viewer has to watch tracker information that is already known and not much use. Thus, what is needed is a method and system that displays the current ticker event data during the playback of the previously recorded video stream. This method and system should also have the capability of omitting a previously recorded stale ticker during the playback of the recorded video stream.

SUMMARY OF THE INVENTION

The present invention is a system and method of controlling the playback of previously recorded event stream information of a particular television channel by a digital video recorder (DVR). The DVR is a computer system configured with a hard drive and video decoder/encoder devices. The DVR system of the present further includes recorder module and playback module. With the recorder module, a user can select a television program that they desire to record. In an alternate embodiment, the recorder module can pre-select television programs to record based upon a user generated recording profile. A user utilizing some type of menu driven user interface generates the user recording profile. A user can select whole programs, video segments by topic, or segments of programs to record. Prior to storage of the selected television programs, the transport stream of the broadcasted signal containing the audio, video, and event information is analyzed and encoded.

Based upon the user generated playback parameters, the playback module retrieves from storage the desired recorded television programs or video segments. With the present invention, as the selected television programs or video segments are decoded for display, the currently broadcasted video signal from the channel on which the retrieved program was initially recorded is captured and analyzed for current event ticker information. If current ticker information is available, the pre-recorded video data is reconstructed to replace the prior recorded ticker information with the current ticker information. During the playback of the recorded program, the current ticker information is displayed on the television screen. This process results in the viewer seeing current ticker information during the playback activity. These and other advantages of the present invention will become apparent upon reading the detailed description below in conjunction with the various drawings.

DETAILED DESCRIPTION OF THE PREFERRED EMBODIMENTS

The present invention will now be described in detail with reference to one embodiment as illustrated in the accompanying drawings. In the following, description, numerous specific details are set forth in order to provide a thorough understanding of the present invention. It will be apparent to one skilled in the art, that the present invention may be practiced without some or all of these specific details. In other instances, well known steps have not been described in detail.

Figure 1:
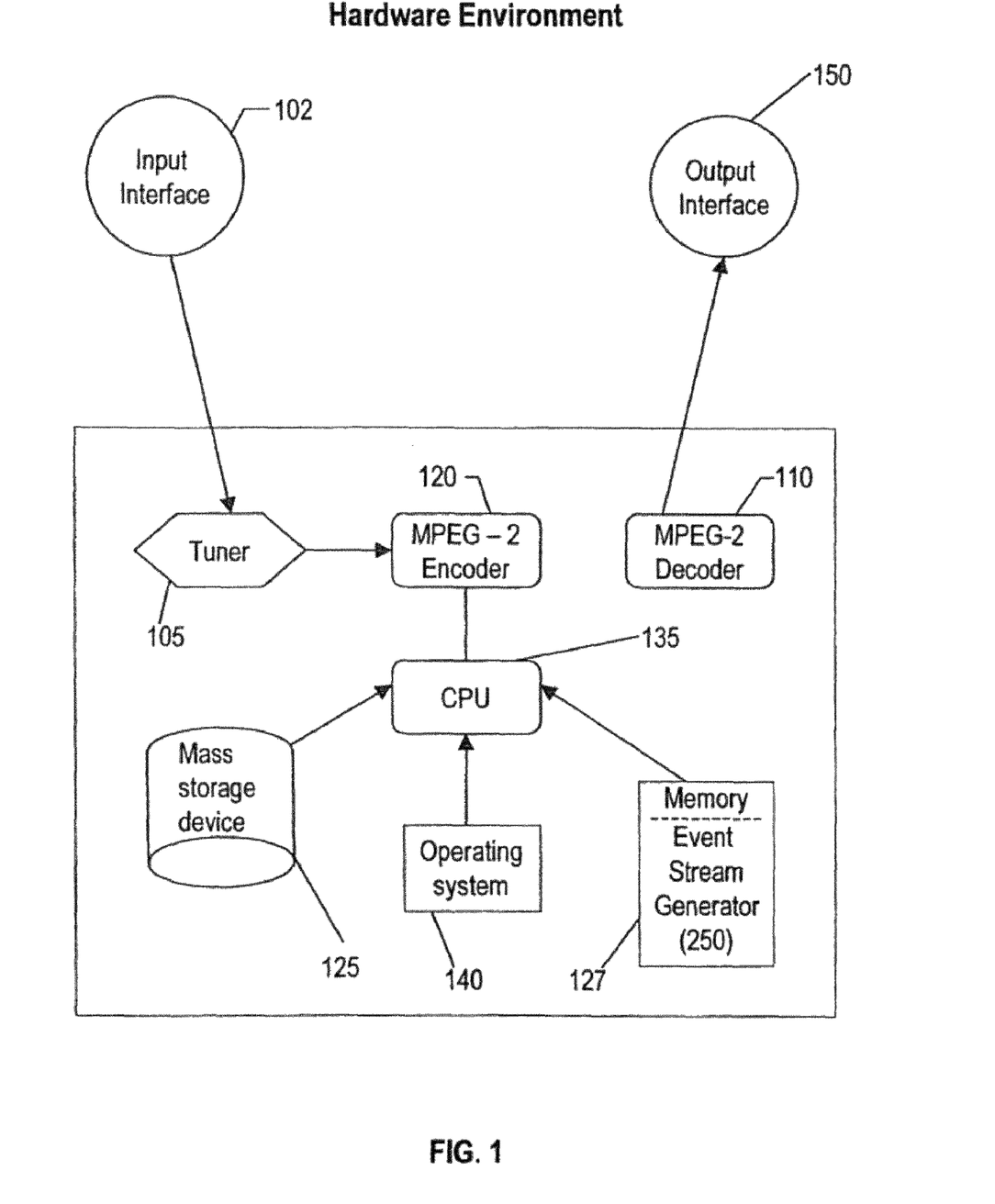
FIG. 1 is a block diagram of the hardware environment supporting the digital video recording device (DVR).

FIG. 1 is a block diagram showing an exemplary hardware environment of digital video recording device (100) utilized in supporting various aspects of the present invention. DVR 100 is a computer system configured with a hard drive and video decoder/encoder devices. The hardware environment of DVR (100) further comprises an input interface (102), tuner (105), MPEG-2 encoder (120), MPEG-2 decoder (110), external mass storage device (125), central processing unit (CPU) (135), internal memory (127), operating system (140), event stream generator (250), and output interface (150).

The Internal Memory (127) stores instructions used in the implementation of the steps in method of the present invention. This memory can be a conventional Random Access Memory (RAM) or read only memory (ROM). Internal memory (127) operates at the highest speed and is directly accessed by CPU (135). RAM is the primary storage used by the CPU and provides temporary storage for the software as the CPU executes it. RAM can be altered. However, ROM cannot be altered and normally stores software that is used upon boot-up of the system.

The CPU 135 performs the software instructions that control the computer. The CPU 135 translates the software into computer instructions and executes the translated computer instructions. CPU (135) locates the instruction in internal memory (127), transfers the instruction into a special buffer known as a register, and then executes the instruction in the register. CPU (135) can be a convention Intel, AMD, or another suitable processor chip.

Operating system software (140) is the software that controls the CPU. In the present invention, operating system software (140) coordinates and manipulates the hardware environment supporting DVR (100). Additionally, operating system software (140) organizes the files on mass storage media (125) as well as manages hardware errors and the loss of data. The TiVO DVR is an example of a recording device on the market that utilizes a specialized LINUX operating system.

The external mass storage media (125) is slower than internal memory (127) and holds data once the device is turned off. Several gigabytes of external storage are required to support hours of motion video recording. The external mass storage media can be a conventional IDE hard drive or another suitable storage device. Additionally, a plurality of hard drives can be daisy chained in RAID configurations.

In addition to the computer hardware requirements described above, the DVR (100) requires specific hardware to support recording digital video streams. The input interface (102) is standard television audio/video input ports. Output interface (150) is standard television audio/video output ports. Tuner 105 is for receiving the broadcasted analog signal. MPEG-2 encoder/decoder chips are for the compression and decompression of the video stream data.

Input interface (102) is an audio/video input data communication port situated on the back of the housing of the DVR (100). The data communication port receives the signal the video signal from an antenna, cable, or satellite and supplies the signal to tuner 105. Tuner 105 selects the frequency of the desired channel and transmits the signal to MPEG-2 encoder 120. Advanced DVR platforms can have more than one tuner. MPEG-2 encoder chip 120 converts the analog signal to digital and compresses the data into the standard MPEG-2 format for storage on the external mass storage media 125. However, tuner 105 and MPEG-2 decoder chip 110 is only required if the broadcasted signal received into input interface 102 is analog. MPEG-2 decoder chip (110) converts the recorded video data or the broadcasted stream data from the MPEG-2 format back to analog and transmits the analog signal to output interface (150), which is the audio/video data communication port, connected to the television.

The Moving Pictures Expert Group developed MPEG-2 which is the standard used to encode audio and video for broadcast signals. These signals include satellite and cable television signals. This standard defines transport streams, which are designated to carry digital video and audio over broadcast signals. Movies are normally filmed at a rate of 24 frames per second. The MPEG encoder (120) illustrated in FIG. 1 analyzes each frame in the transmitted signal and determines how to encode and compress each frame into MPEG-2 format. A frame can be encoded as an intraframe (I picture) which contains the complete image, a predicted frame (P picture) which contains enough information on how to display the frame based upon the prior frame, and a bi-directional frame (B picture) which contains surround information on how to display the frame based upon the intraframe or the predicted frame.

Figure 6:
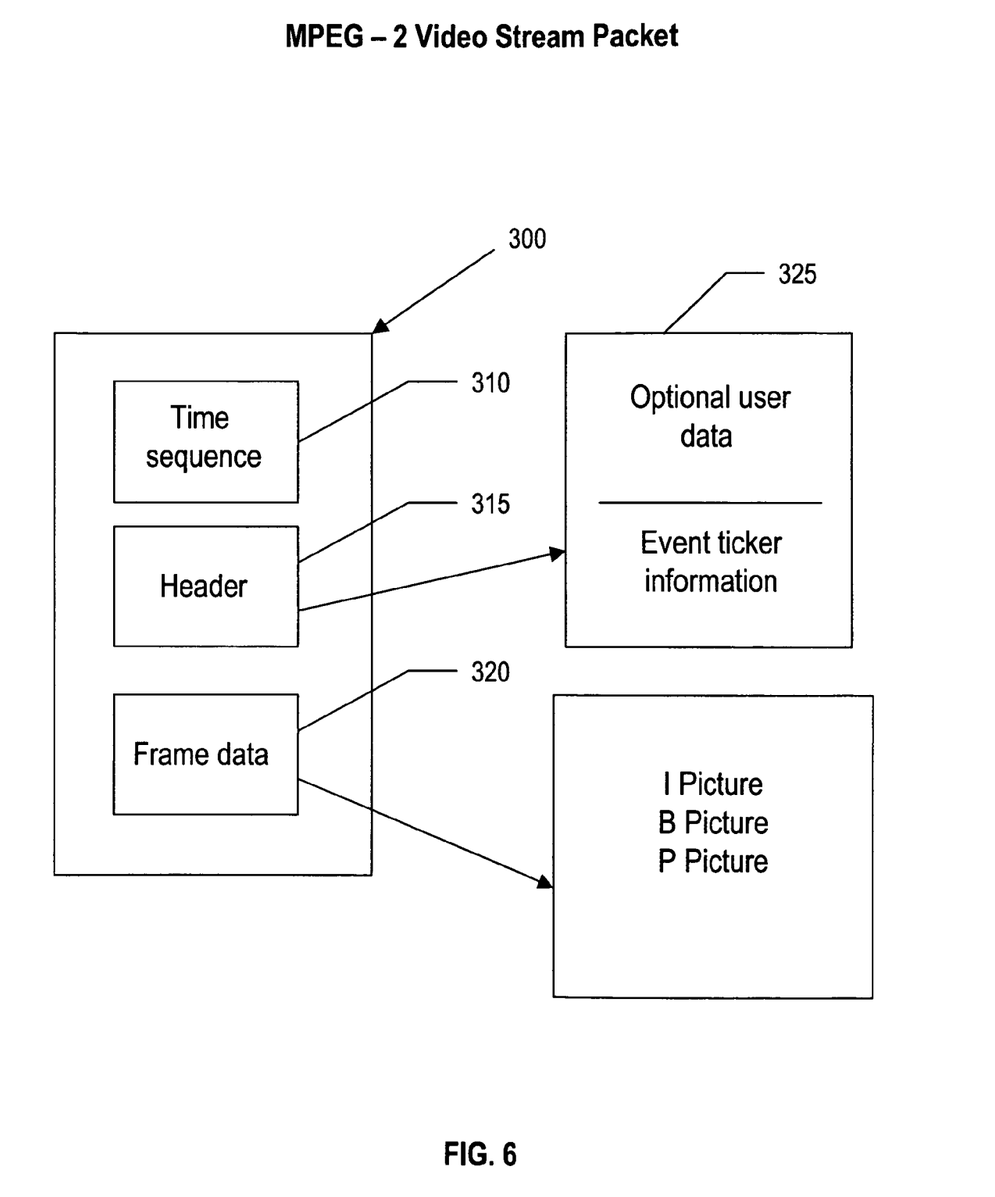
FIG. 6 is a block diagram of the MPEG-2 Video Stream Data.

MPEG-2 encoder (120) in FIG. 1 receives the broadcasted signal and generates a sequence of picture frames (i.e. I picture, P picture, or B picture). Each picture frame would be an encoded video access unit. Referring to FIG. 6, illustrated is a sample MPEG-2 video packet (300) that includes sequence information 310, a header 315, and a picture frame 320. Sequence information 310 is used for channel information. Header 315 includes picture frame type information along with an optional user data field 325. Generally event information is embedded within the user data field 325. Picture frame 320 would contain an encoded I picture, B picture, or P picture. Thus, the stored MPEG-2 video stream comprises a sequence of I picture frames, B picture frames, and P pictures representing the broadcasted signal, and the ticker information is embedded within header of each picture frame.

Figure 2:
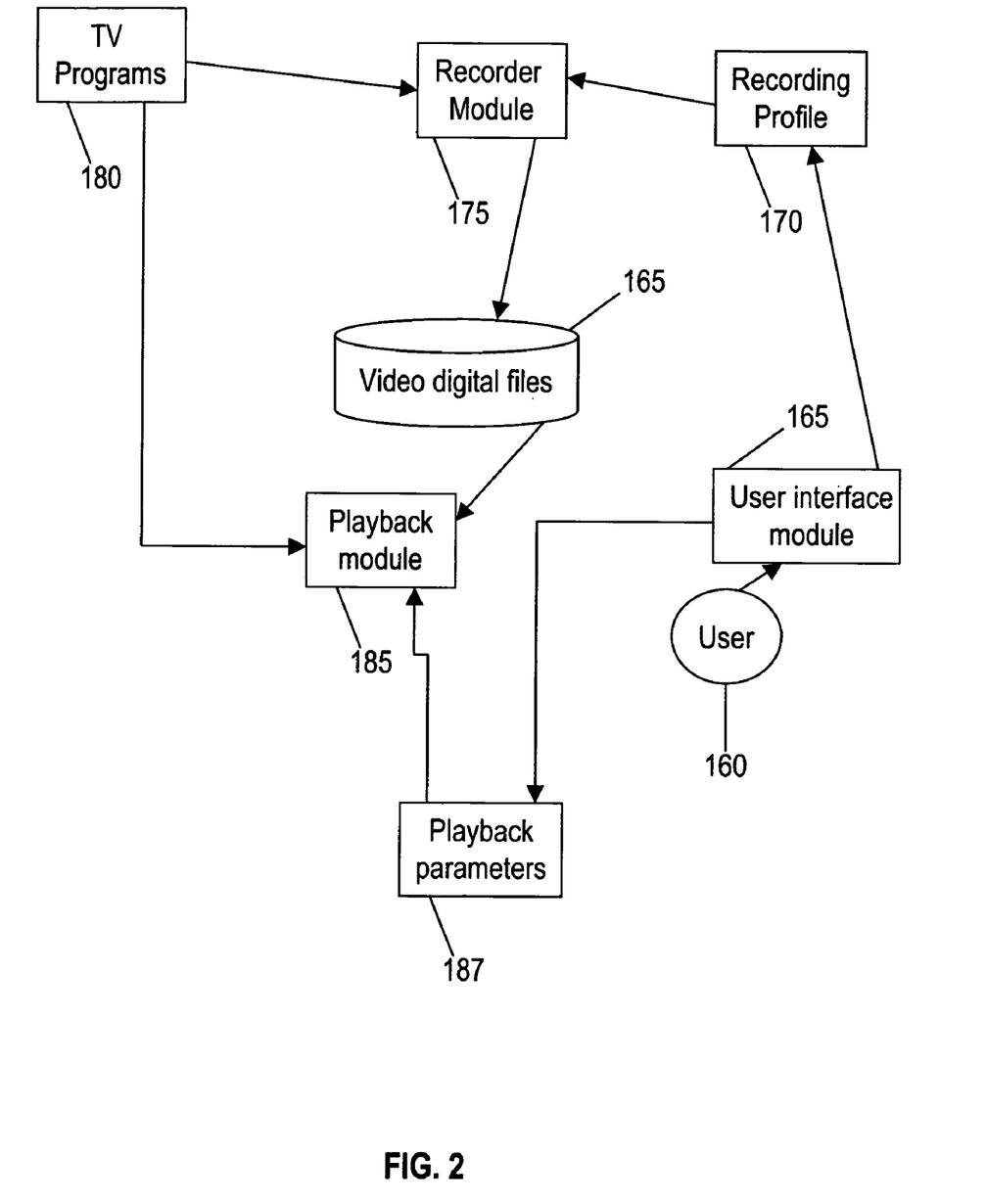
FIG. 2 is a block diagram of the system overview of the present invention.

FIG. 2 illustrates a system overview of the present invention. DVR (100) system of the present further includes recorder module 175 and playback module 185. Recorder module 175 pre-selects television programs 180 to record based upon a user generated recording profile 170. A user 160 utilizing some type of menu driven user interface 165 generates the user recording profile 170. A user can select whole programs, video segments by topic, or segments of programs to record. Prior to storage of the selected television programs 180, the transport stream of the broadcasted video signal containing the audio, video, and event information is analyzed and encoded.

Based upon the user generated playback parameters (187), playback module (185) selects from storage the desired recorded television programs or video segments. The selected television programs or video segments are decoded for playback on the television. With the present invention, as the selected television programs or video segments are decoded for display, the current broadcasted video signal is captured and analyzed for current event ticker information. If current ticker information is available, the pre-recorded video data is reconstructed with the current ticker information prior to playback on the television.

Figure 3:
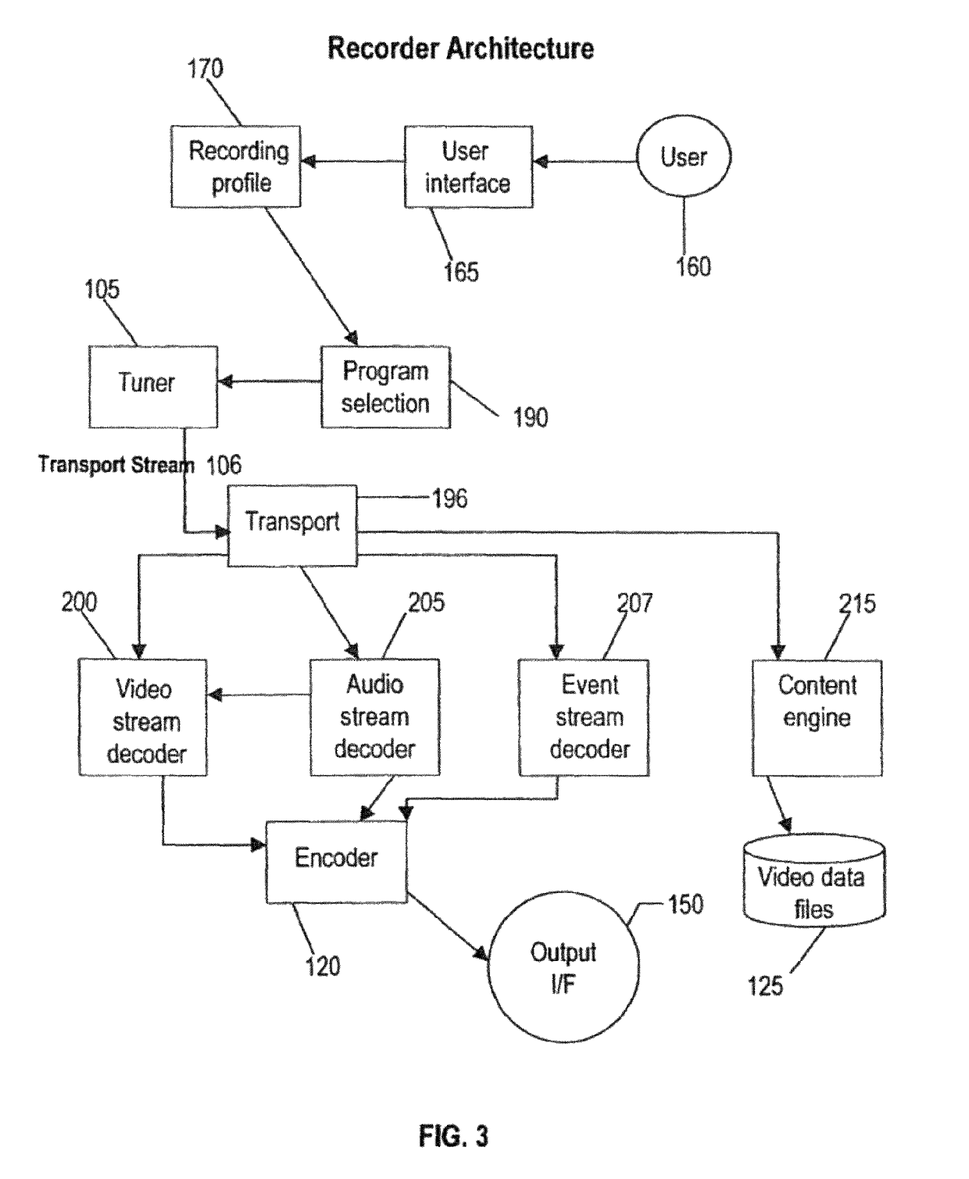
FIG. 3 is a block diagram of the recording function of the present invention.

FIG. 3 illustrates one embodiment of the architecture of the recorder subsystem of the present invention. At the profile module 170, a user recording profile is generated from the recording requests inputted by the user through user interface 165. The recording requests can be for whole television programs or a topic based video segments. At the program selection module 190, the generated recording profile is used to create program selections, which are provided to tuner 105. Based upon the program selections, tuner 105 captures the MPEG-2 video signal relating to the program selection and outputs the transport stream 106, which contains all components of the compressed video stream. At the transport module 196, the transport stream 106 is monitored to establish packet boundaries so that the data fields can be processed. The packets in the transport stream 106 are separated into video, audio, and event ticker information compressed data streams and sent to the video 200, audio 205, and event ticker information 204 decoders, respectively. Additionally, the system information in packets incorporated in transport stream 106 are extracted and sent to content engine 215.

At module 205, the audio decoder accepts the compressed audio data stream from the transport stream. The control and synchronization information is extracted from the packet header. Then, the data information is decoded to reconstruct uncompressed digital audio samples. The uncompressed digital audio samples are forwarded to encoder 210 for digital-to-analog conversion for playback on the television.

At the video stream decoder module 200, the video decoder accepts the compressed video data stream from the transport stream. The control and synchronization information is extracted from the packet header. Then, the data information is decoded to reconstruct uncompressed digital video frames. The uncompressed digital frames are forwarded to the encoder 120 which is encoded into PAL or NTSC format and transmitted through output interface 150 for playback on the television.

At the event stream decoder module 207, the event stream decoder accepts the compressed event information data stream from the transport stream. The control and synchronization information is extracted from the packet header. Then, the event information data stream is decoded to reconstruct an uncompressed event information data stream. The uncompressed event data frames are forwarded to encoder 120 for playback on the television.

Extracted system information along with the composite video stream is sent to the content engine 215. The composite compressed stream is stored as video digital files on mass storage device 125. Indexing tables to navigate through the stored video digital files are constructed from the extracted system information. Additionally, the system information is used to support the electronic programming guides used within the menu-driven user interface 165.

Figure 4:
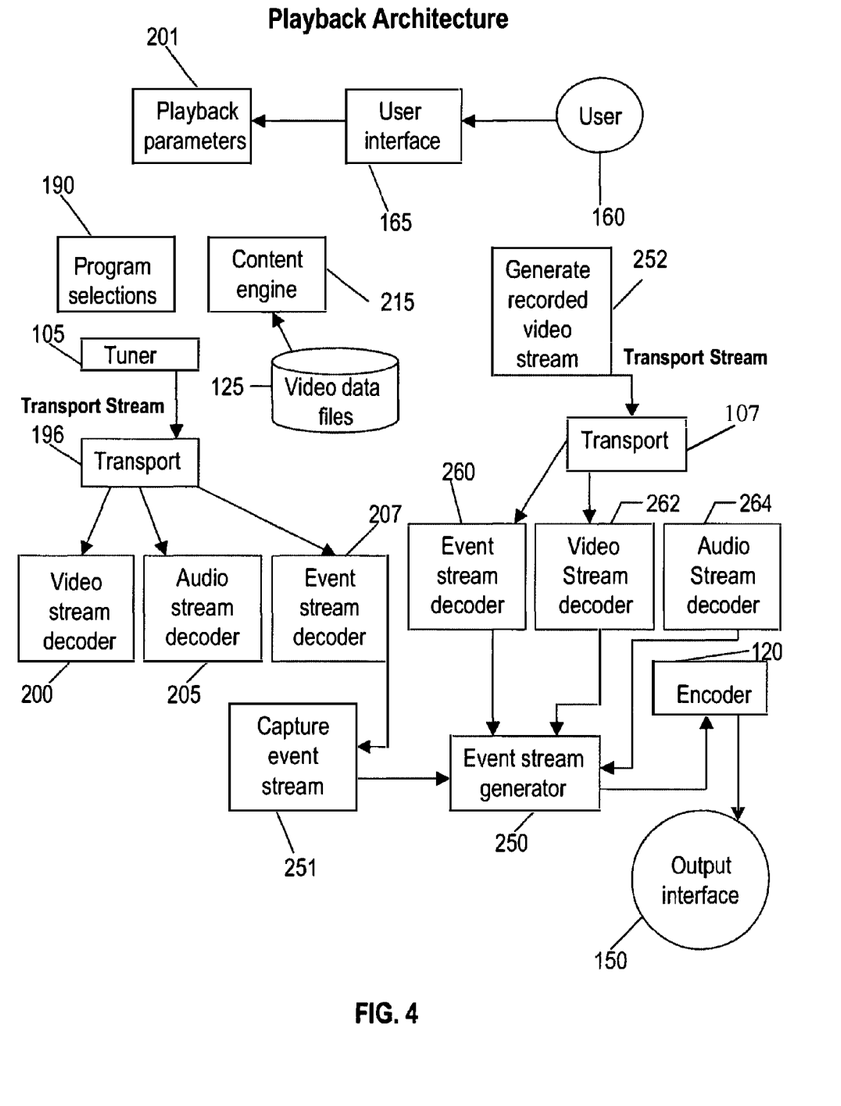
FIG. 4 is a block diagram of the playback function of the present invention.

FIG. 4 illustrates the architecture of the playback subsystem of the present invention. At playback module 201, user 160 generates playback parameters through menu-driven user interface 165. Playback parameters can contain requests to access whole television programs or a topic based video segments. Additionally, user 160 initiates the event stream generation process.

At the content engine module 215, the user generated playback parameters are used by the content engine 215 to retrieve the required video data files from the mass storage device 125. The retrieved video data files, which are stored in compressed MPEG-2 format, are used by module 252 to generate transport stream 107.

At module 255, the transport stream 107 is monitored to establish packet boundaries so that the data fields can be processed. The packets in the transport stream 106 are separated into video, audio, and event ticker information compressed data streams and sent to the video 262, audio 264, and event ticker information 260 decoder, respectively.

At module 264, the audio decoder accepts the compressed audio data stream from the transport stream. The control and synchronization information is extracted from the packet header. Then, the data information is decoded to reconstruct uncompressed digital audio samples. The uncompressed digital audio samples are forwarded to the event stream generator 250.

At module 262, the video decoder accepts the compressed video data stream from the transport stream. The control and synchronization information is extracted from the packet header. Then, the data information is decoded to reconstruct uncompressed digital video frames. The uncompressed digital frames are forwarded to the event stream generator 250.

At module 260, the event stream decoder accepts the compressed event information data stream from the transport stream. The control and synchronization information is extracted from the packet header. Then, the event information data stream is decoded to reconstruct an uncompressed event information data stream. The uncompressed event data frames are forwarded to event stream generator 250.

Concurrently with the playback of the selected recorded stream as described above, the event stream from the broadcasted signal is captured and analyzed. The captured event stream is also forwarded to event stream generator 250. This process is described below.

At module 190, the generated playback parameters are used to create program selections for the capture of the programs with the event information corresponding to the programs selected by the user within the playback parameters. Based upon the program selections, tuner 105 captures the MPEG-2 video signal relating to the program selection and outputs the transport stream 106, which is, contains all components of the compressed video stream. At module 196, the transport stream 106 is monitored to establish packet boundaries so that the data fields can be processed. The packets in the transport stream 106 are separated into video, audio, and event ticker information compressed data streams and sent to the video 200, audio 205, and event ticker information 204 decoder, respectively.

At module 207, the event stream decoder accepts the compressed event information data stream from the transport stream. The control and synchronization information is extracted from the packet header. Then, the event information data stream is decoded to reconstruct an uncompressed event information data stream. The uncompressed event data frames are forwarded to module 251. At module 251, the current event data stream is captured and stored. The captured event data is forwarded to event stream generator process 250.

In the method of the present invention, the initial step is to set the recorder to record the program. This process involves providing the parameters for recording the program. These parameters can include the date and time of the program, the length of the recording time and the channel of the program. As with conventional recording devices, this device will have a tuning that enables the devices to receive most television station signals. For cable and satellite systems, programs are received at the recording device at the frequencies of channels three (3) or four (4). After the recording is complete, the parameters can be stored along with the recorded material on the disc. When the user is ready to view the recorded program, the user can enter an identifier parameter for that program. This identifier can be generated by the device and given to the user or the user may have the option of creating a program identifier. With the program identifier, the desired recording is identified and retrieved. As part of the process of the present invention, the channel of the recorded program is also retrieved. This channel parameter tells the device tuner the channel frequency that broadcast the recorded program. At this point, there is a determination as to whether the recorded program contained a news ticker. If the determination were that the recorded program did not contain a news ticker, then the playback process would immediately begin. However, if the determination is that the recorded program did contain a news ticker, the next step is determine whether the channel responsible for the recorded program currently has a news ticker. If this channel currently does not have a news ticker, the next step is playing the recorded program without any news ticker information. Another, but less attractive option is to display the recorded program with the older ticker information. If the channel currently does have a news ticker, the method of the present invention would retrieve the current news ticker information displayed in the current broadcast from that station and incorporate that ticker information on the current playback of the recorded program.

Figure 5:
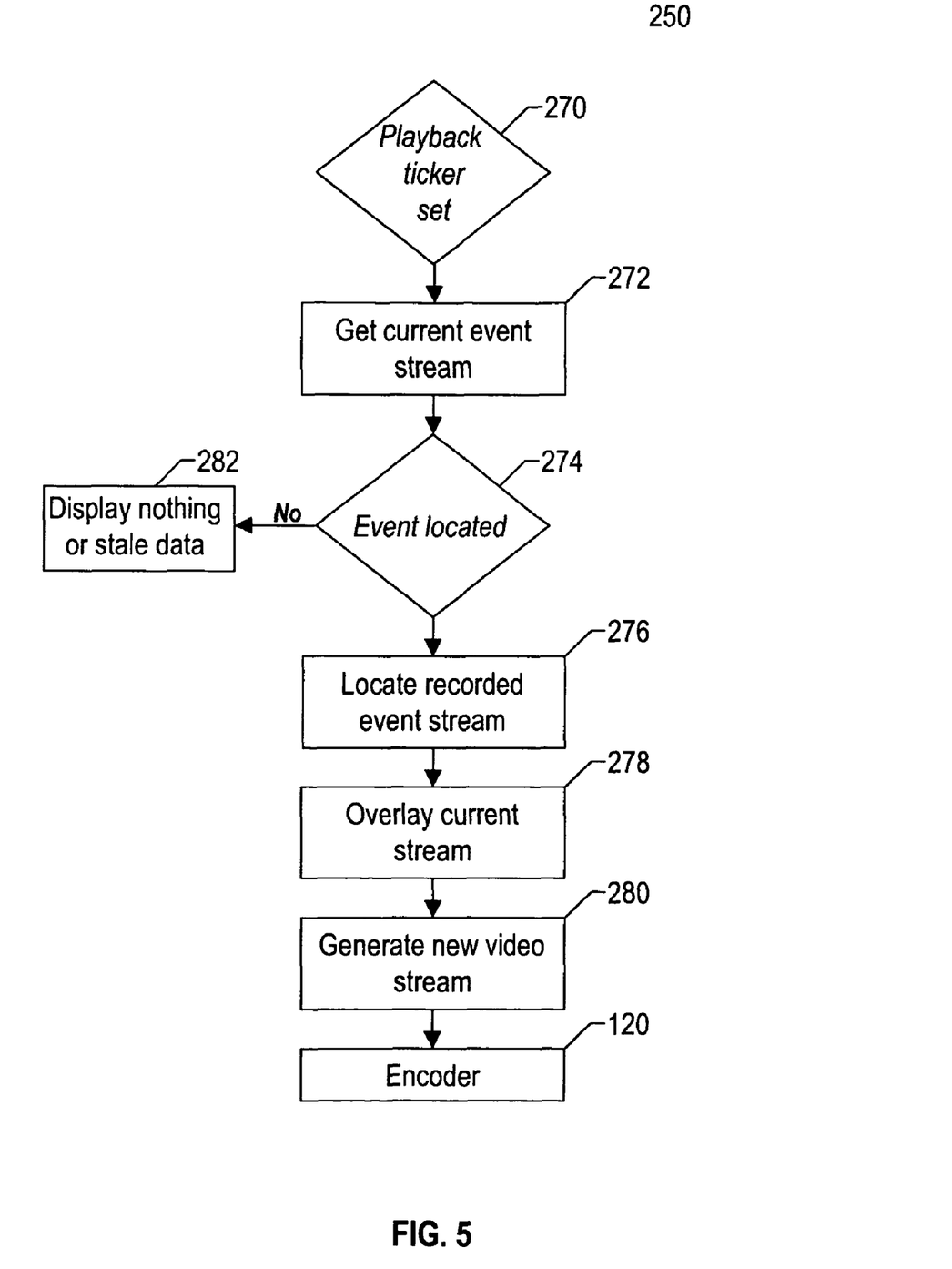
FIG. 5 is a flow chart illustrating the ticker re-constructor software function.

Illustrated in FIG. 5, is a flow chart of the event stream generator process 250. At step 270, a check is made to see if the playback ticker information is set for a specific recorded program. If the playback ticker is set, then the process proceeds to step 272 to retrieve the current event stream for that specific channel. If an event is not located within the current event stream, then at step 282 either a stale event ticker is displayed or nothing is displayed. However, if an event is located at step 274, event stream is located within the recorded video stream. Then, at step 278, the current event stream is substituted for the recorded event stream. At step 280, a new composite video stream is generated containing the current event stream and the recorded video stream. The generated composite video stream is feed into encoder 120, which generates analog signals for playback on the television.

Figure 7A:
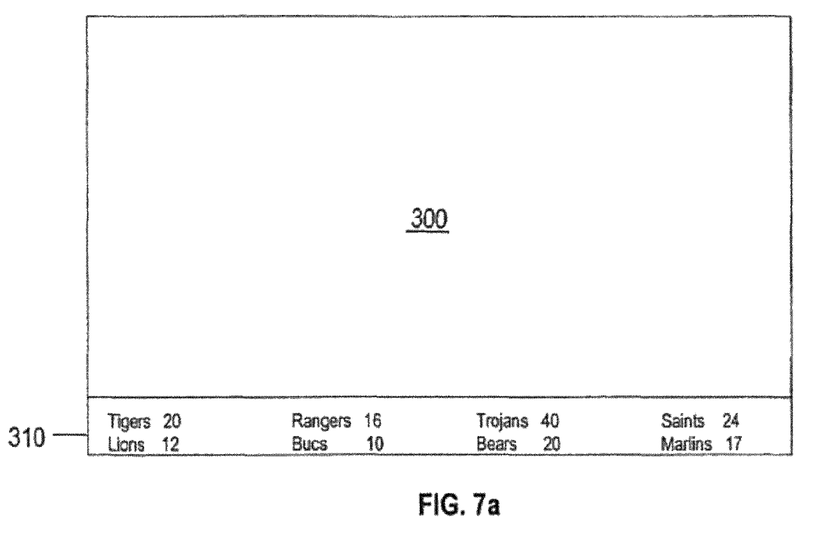
FIG. 7a shows the display screen at the time of recording having a sports news ticker.
Figure 7B:
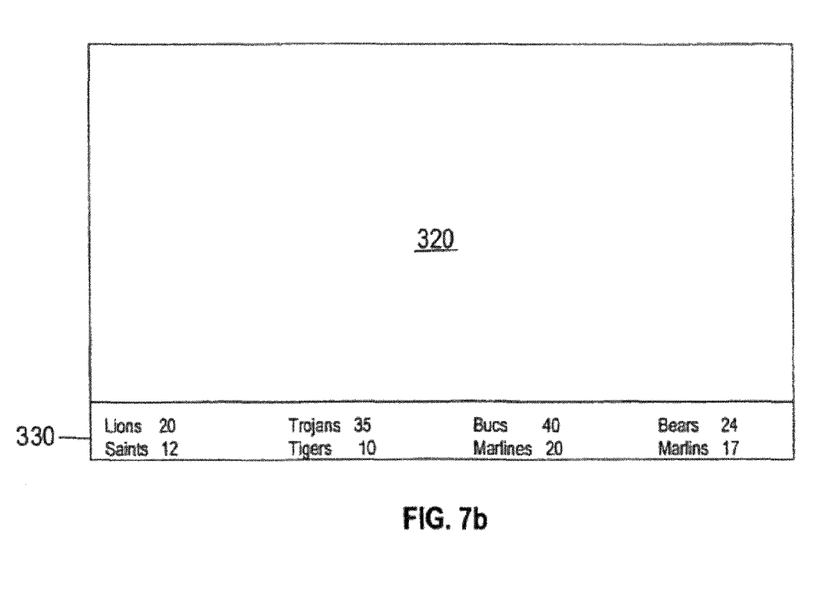
FIG. 7b shows a new display screen at the time of playback with a different sports news ticker.

FIG. 7a shows a television program 300 on a channel having a sports news ticker 310 at the bottom of the screen. This sports news ticker has results from several games played on the date that the program was recorded. As mentioned, this sports ticker 310 was recorded as part of the program. FIG. 7b shows the screen 320 of the recorded program during the playback of the program. In accordance with the method of the present invention, the screen displays a different sport ticker 330 having results from several games played on the date that the user plays back the recorded program. In this illustration, the ticker is sports information. At another time, the news ticker for that channel may display a different news subject matter such as the day's news headlines. In addition, if the user kept the recorded program and desired the playback of the program a second time, during that second playback session, the news ticker would display information that is currently displayed on that channel instead of the previously recorded news information.

It is important to note that while the present invention has been described in the context of several preferred embodiments, there are alterations, permutations, and equivalents, which fall within the scope of this invention. Those skilled in the art will appreciate that the processes of the present invention are capable of being distributed in the form of instructions in a computer readable medium in the form of a storage device or memory, such as EPROM, ROM, tape, paper, floppy disc, hard disk drive, RAM, and CD-ROMs. Thus, a computer program product comprises the computer readable storage device or memory and the instructions stored therein, wherein the instructions are configured to be executed by a processor (e.g., the CPU 135 in the computer system of FIG. 1) to perform the methods of the present invention.

What is claimed is:

1. In a digital video recording system configured with a processor and at least one mass storage device, a method for incorporating a current event data stream from a television broadcasted video signal onto a pre-recorded video stream for playback on a television set, said method comprising:
   retrieving, by said processor, a first digital video stream from the at least one mass storage device, said first digital video stream comprising television program content and a first event data stream;
   ascertaining, by said processor, whether a current event is located in the current event data stream in the television broadcasted video signal;
   if said ascertaining ascertains that the current event is located in the current event data stream in the television broadcasted video signal, then
      automatically replacing, by said processor, the first event data stream with the current event data stream in the retrieved first digital video stream to generate a composite video stream containing the television program content and the current event data stream;
      after said replacing the first event data stream, playing back, by said processor, on a screen of the television set the television program content concurrently with the current event data stream, said television program content and said current event data stream being concurrently visible on the screen during said playing back;
   if said ascertaining ascertains that the current event is not located in the current event data stream in the television broadcasted video signal, then
      automatically retaining, by said processor, the retrieved first digital video stream without replacing the first event data stream in the retrieved first digital video stream;
      after said retaining the retrieved first digital video stream, playing back, by said processor, on the screen of the television set the television program content in the retained first digital video stream.

2. The method of claim 1, wherein said ascertaining ascertains that the current event is located in the current event data stream in the television broadcasted video signal.

3. The method of claim 2, wherein the screen of the television set consists of a first portion and a second portion, wherein said playing back comprises concurrently playing back the television program content on the first portion of the screen and playing back the current event data stream on the second portion of the screen, and wherein the first portion and the second portion are mutually exclusive.

4. The method of claim 1, wherein said ascertaining ascertains that the current event is not located in the current event data stream in the television broadcasted video signal.

5. The method of claim 1, said method further comprising:
   said processor determining that the first event data stream includes a first event, wherein said ascertaining is performed in response to said determining that the first event data stream includes the first event.

6. The method of claim 1, said method further comprising:
   said processor receiving the first digital video stream comprising the television program content, said first digital video stream containing a first event data stream; and
   prior to said retrieving, said processor recording the received first digital video stream onto the at least one mass storage device.

7. The method of claim 6, wherein said recording the received first digital video stream is based upon a user's playback requirements for the first digital video stream.

8. A digital video recording system for incorporating a current event data stream from a television broadcasted video signal onto a pre-recorded video stream for playback on a television set, said system comprising:
   a processor;
   a mass storage device coupled to the processor;
   a computer readable memory coupled to the processor;
   first program instructions to retrieve a first digital video stream from the at least one mass storage device, said first digital video stream comprising television program content and a first event data stream;
   second program instructions to ascertain whether a current event is located in the current event data stream in the television broadcasted video signal;
   third program instructions to respond to ascertaining that the current event is located in the current event data stream in the television broadcasted video signal, said third program instructions comprising:
      program instructions to automatically replace the first event data stream with the current event data stream in the retrieved first digital video stream to generate a composite video stream containing the television program content and the current event data stream; and program instructions to play back, on a screen of the television set after the first event data stream is replaced, the television program content concurrently with the current event data stream, said television program content and said current event data stream being concurrently visible on the screen during said playing back;

fourth program instructions to respond to ascertaining that the current event is not located in the current event data stream in the television broadcasted video signal, said fourth program instructions comprising:

program instructions to automatically retain the retrieved first digital video stream without replacing the first event data stream in the retrieved first digital video stream; and program instructions to play back on the screen of the television set, after the retrieved first digital video stream is retained, the television program content in the retained first digital video stream, wherein the first program instructions, the second program instructions, the third program instructions, and the fourth program instructions are stored on the mass storage device for execution by the processor via the computer readable memory.

9. The system of claim 8, wherein the screen of the television set consists of a first portion and a second portion, wherein said program instructions to play back said television program content comprise program instructions to concurrently play back said television program content on the first portion of the screen and play back the current event data stream on the second portion of the screen, and wherein the first portion and the second portion are mutually exclusive.

10. The system of claim 8, said system further comprising:
fifth program instructions to determine that the first event data stream includes a first event, wherein said second program instructions to ascertain comprise program instructions to ascertain, in response to a determination having been made that the first event data stream includes the first event, whether the current event is located in the current event data stream in the television broadcasted video signal, wherein the fifth program instructions are stored on the mass storage device for execution by the processor via the computer readable memory.

11. The system of claim 8, said system further comprising:
fifth program instructions to receive the first digital video stream comprising the television program content, said first digital video stream containing a first event data stream; and sixth program instructions to record, prior to the first digital video stream having been retrieved from the at least one mass storage device, the received first digital video stream onto the at least one mass storage device, wherein the fifth program instructions and the sixth program instructions are stored on the mass storage device for execution by the processor via the computer readable memory.

12. The system of claim 11, wherein a recording of the received first digital video stream via execution of the sixth program instructions is based upon a user's playback requirements for the first digital video stream.

13. A computer program product for incorporating a current event data stream from a television broadcasted video signal onto a pre-recorded video stream for playback on a television set, said computer program product comprising:

a mass storage device;

first program instructions to retrieve a first digital video stream from the at least one mass storage device, said first digital video stream comprising television program content and a first event data stream;

second program instructions to ascertain whether a current event is located in the current event data stream in the television broadcasted video signal;

third program instructions to respond to ascertaining that the current event is located in the current event data stream in the television broadcasted video signal, said third program instructions comprising:

program instructions to automatically replace the first event data stream with the current event data stream in the retrieved first digital video stream to generate a composite video stream containing the television program content and the current event data stream; and program instructions to play back, on a screen of the television set after the first event data stream is replaced, the television program content concurrently with the current event data stream, said television program content and said current event data stream being concurrently visible on the screen during said playing back;

fourth program instructions to respond to ascertaining that the current event is not located in the current event data stream in the television broadcasted video signal, said fourth program instructions comprising:

program instructions to automatically retain the retrieved first digital video stream without replacing the first event data stream in the retrieved first digital video stream; and program instructions to play back on the screen of the television set, after the retrieved first digital video stream is retained, the television program content in the retained first digital video stream, wherein the first program instructions, the second program instructions, the third program instructions, and the fourth program instructions are stored on the mass storage device for execution by a processor.

14. The computer program product of claim 13, wherein the screen of the television set consists of a first portion and a second portion, wherein said program instructions to play back said television program content comprise program instructions to concurrently play back said television program content on the first portion of the screen and play back the current event data stream on the second portion of the screen, and wherein the first portion and the second portion are mutually exclusive.

15. The computer program product of claim 13, said system further comprising:
fifth program instructions to determine that the first event data stream includes a first event, wherein said second program instructions to ascertain comprise program instructions to ascertain, in response to a determination having been made that the first event data stream includes the first event, whether the current event is located in the current event data stream in the television broadcasted video signal, wherein the fifth program instructions are stored on the mass storage device for execution by the processor.

16. The computer program product of claim 13, said system further comprising:
fifth program instructions to receive the first digital video stream comprising the television program content, said first digital video stream containing a first event data stream; and sixth program instructions to record, prior to the first digital video stream having been retrieved from the at least one mass storage device, the received first digital video stream onto the at least one mass storage device,
wherein the fifth program instructions and the sixth program instructions are stored on the mass storage device for execution by the processor.

17. The computer program product of claim 16, wherein a recording of the received first digital video stream via execution of the sixth program instructions is based upon a user's playback requirements for the first digital video stream.

* * * * *